United States Patent Office 3,445,640
Patented May 20, 1969

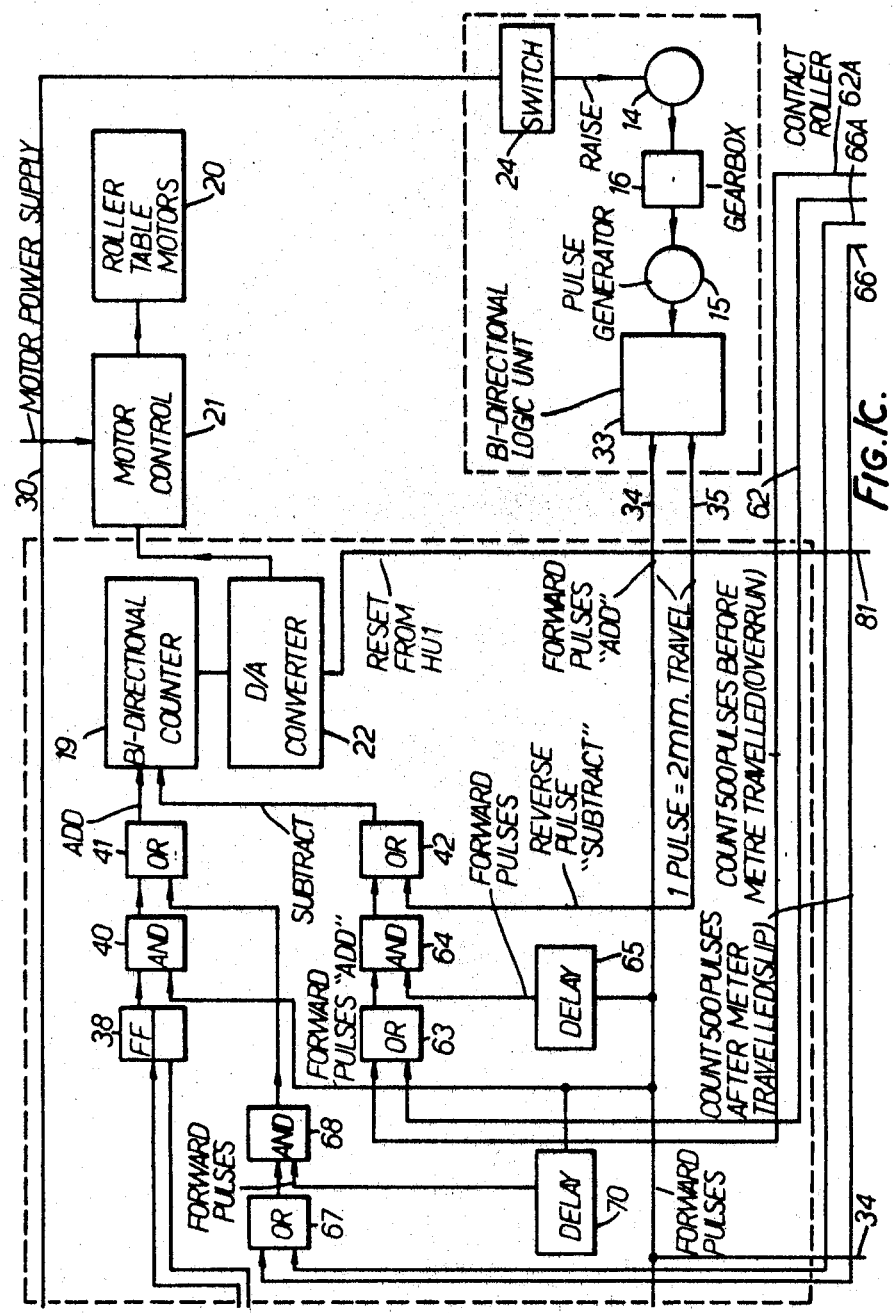

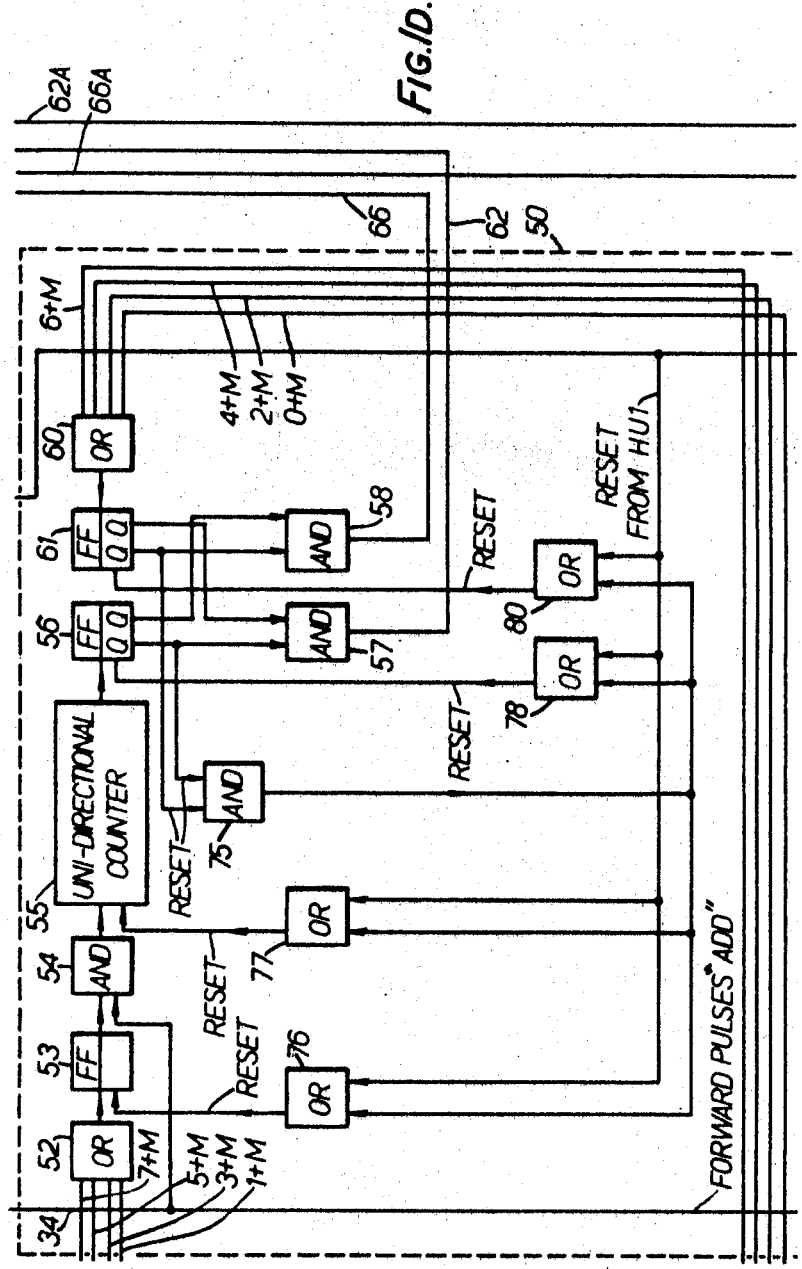

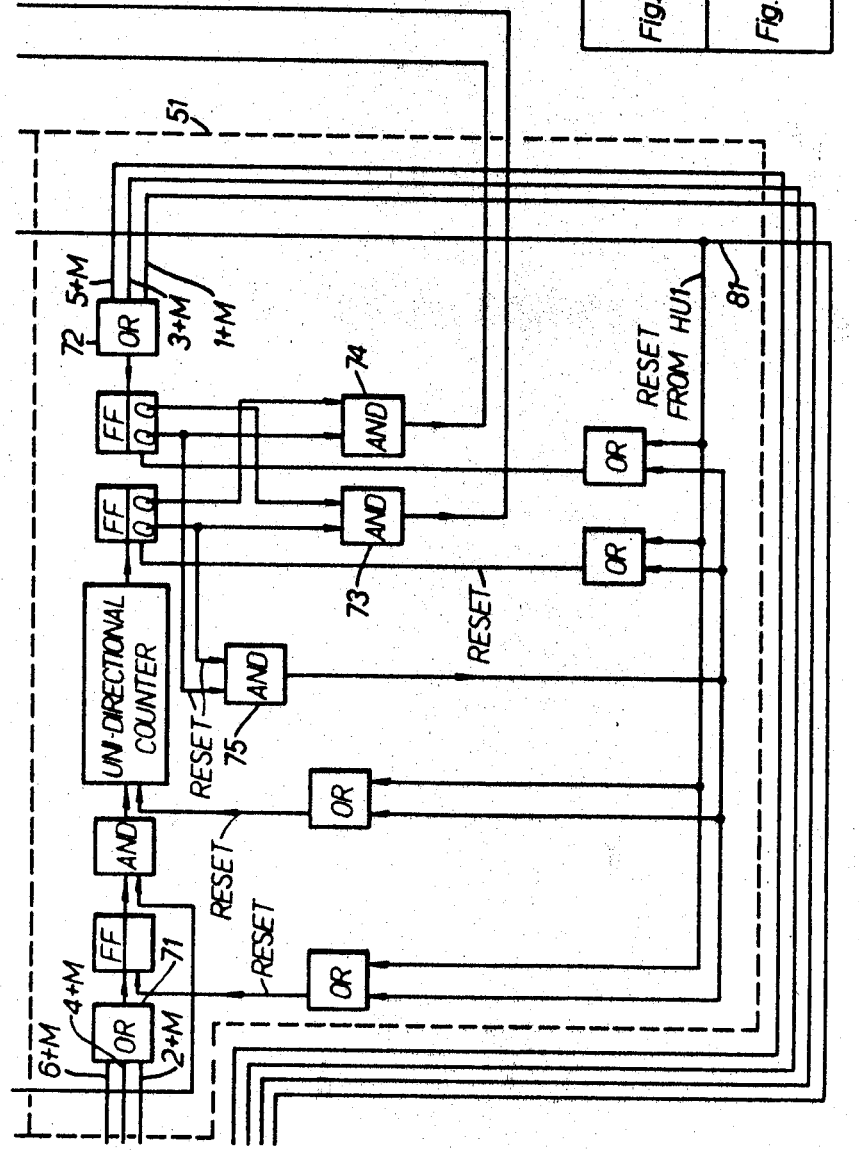

3,445,640
APPARATUS FOR MONITORING THE POSITION OF AN OBJECT DISPLACEABLE ALONG A PREDETERMINED PATH
James Arthur Harrison and Brian Quartermain, Chesterfield, England, assignors to Davy and United Engineering Company Limited, Sheffield, England
Filed Jan. 29, 1965, Ser. No. 429,070
Int. Cl. G08c 21/00
U.S. Cl. 235—151.32                            4 Claims

ABSTRACT OF THE DISCLOSURE

Apparatus for automatically controlling the movement of an object, such as an elongated beam, along a predetermined path. At least a pair of detectors are spaced along the path, each attached to detect the passage of the object. A pulse generator emits a pulse for each unit movement of the object, the unit being a small submultiple of the spacing of the detectors, and a counter counts the pulses. A circuit checks the number of pulses emitted by the generator between the passage of the object past successive detectors, and corrects the count of the counter on the occurrence of disparity between the number of pulses emitted and the distance between successive detectors.

---

This invention relates to the automatic control of the movement of material in elongate form, particularly for stopping the material at a preselected position.

In U.S. Patent No. 3,322,961, there are described a method and apparatus for controlling the movement of an elongate body, such as a beam, so that the body is brought to rest when a desired length has passed a fixed point. The invention described in that specification is particularly concerned with stopping a beam after a required length has passed a cutting device, so that that required length may be cut from the beam.

The apparatus of the above-mentioned specification comprises a series of detectors spaced along the path of movement of the body and constituting a coarse position detecting system, and a pulse generator giving a pulse for each unit movement of the body and constituting a fine detecting system. The generator is driven by a roller in contact with the body and there is danger of slip between the roller and body, giving rise to errors in the fine position detection of the body.

In a particular form, the invention provides means for checking the operation of the pulse generator and for making corrections if errors arise.

Thus according to the present invention, apparatus for monitoring the position of an object along a predetermined path comprises at least a pair of detectors spaced along the path, each arranged to detect the passage of an object, a pulse generator for emitting a pulse for each unit movement of the object, that unit being a small submultiple of the spacing of the detectors, a counter for counting the pulses, a circuit for checking the number of pulses emitted by the generator between passage of an object past successive detectors, and means operated by the checking circuit for correcting the count of the counter on the occurrence of disparity between the number of pulses emitted and the distance between successive detectors.

Figure 1A:
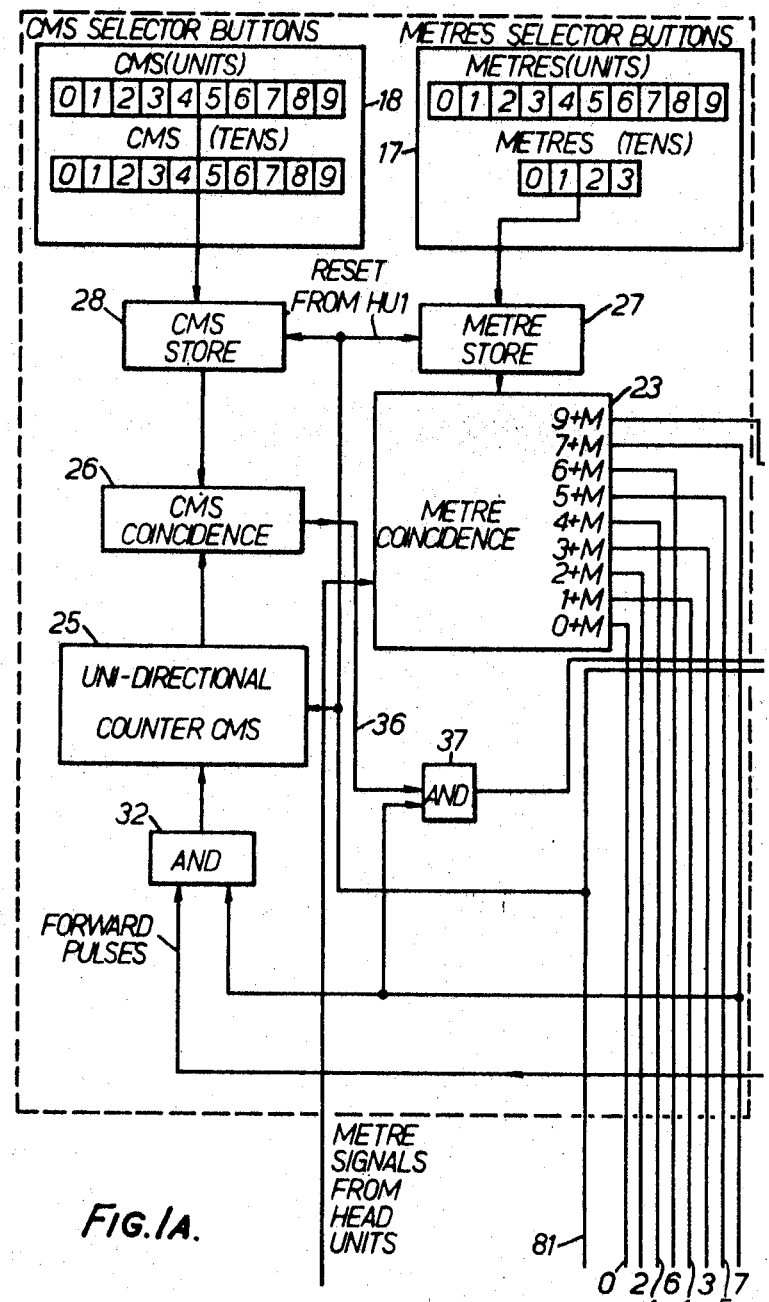
Figure 1B:
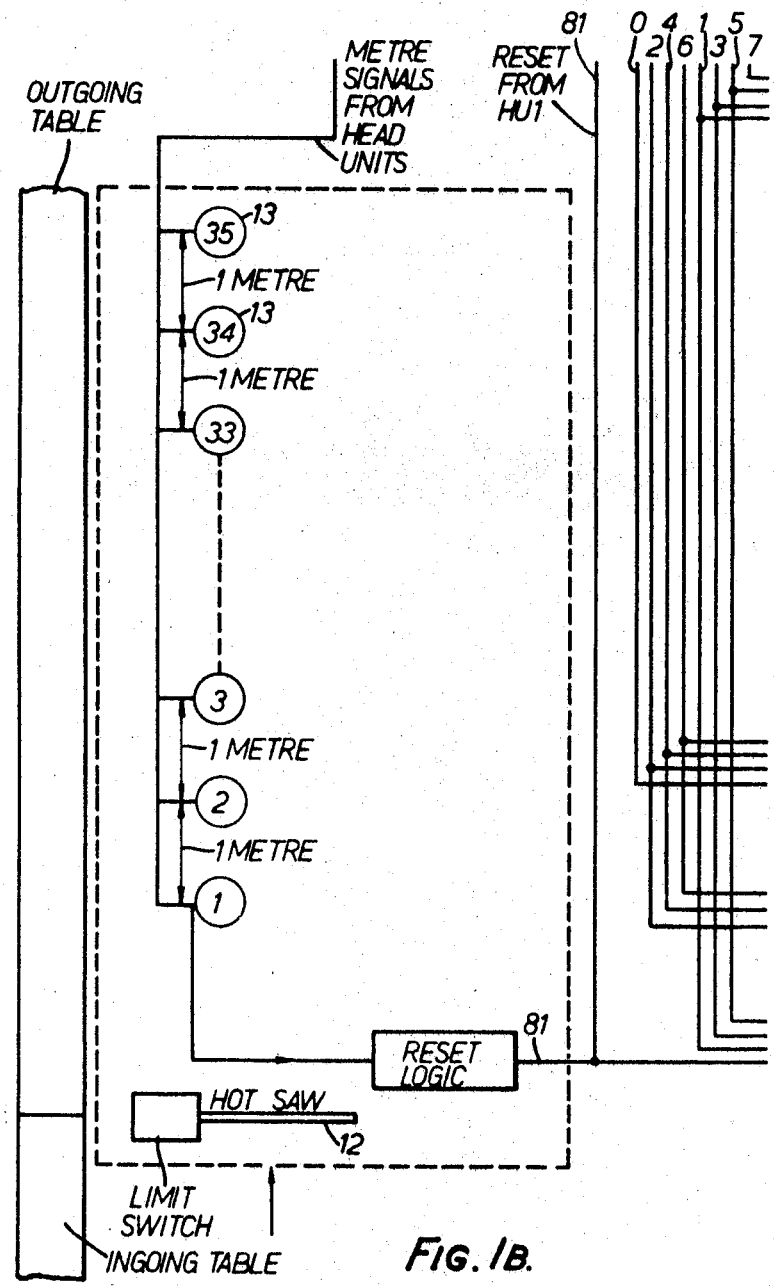

The invention will be more readily understood by way of example from the following description of a control system for controlling the movement of a beam past a saw, to bring the beam to rest when a preselected length of the beam has passed the saw. Reference is made to the accompanying drawing consisting of FIGURES 1A through 1E, which schematically illustrates the system.

In the drawing, the saw is indicated at 12, the beam to be cut into preselected lengths being moved past the saw in the direction of the arrow by independently controlled roller tables (not shown) upstream and downstream of the saw. At the downstream side, the position of the leading end of the beam is detected by a series of photocells 13 arranged at one metre intervals; the position of the leading end of the beam between consecutive photocells 13 can be continuously monitored by a roller 14 which contacts the beam and which drives a pulse generator 15 through a gear box 16, so that one pulse is generated for each two millimetre movement of the beam.

The required beam length is set up in metres and centimetres on two pushbutton stations 17 and 18, respectively. The motors 20 for the roller tables are controlled by a motor control circuit 21 which, in turn, is controlled by a digital-to-analogue converter 22. This converter 22 controls the motor control circuit 21 in accordance with the number of pulses generated by pulse generator 15 and counted by a counter 19.

Before describing the circuit in detail, its general operation will be briefly described: the system operates to bring the beam to rest with the leading end at a distance from the saw 12 equal to the length set up on the pushbuttton stations 17, 18. By way of example, suppose that the length set up on stations 17, 18 is X metres and Y centimetres. As the beam moves away from the saw 12, the leading end is successively detected by the photocells 13, the signals from which are compared in a coincidence circuit 23 with the length in metres set up in station 17. When the difference between the required length in metres (X) and the distance measured by the photocells 13 is 9 metres, the coincidence circuit 23 operates a switch 24 to lower the roller 14 on to the beam. The pulses produced by pulse generator 15, following the lowering of the roller 14, are not utilised for another 2 metres of movement of the beam, in order to enable the roller 14 to reach the speed of the beam without slip. However, when the coincidence circuit 23 detects that there is a difference of 7 metres between the length X set up on station 17 and the distance detected by the photocells 13, the pulses from the generator 15 are applied to a counter 25 and the count in the counter 25 is compared with the distance Y in centimetres set up on station 18. When coincidence is detected by a coincidence circuit 26, i.e., when the leading end of the beam is at a distance from saw 12 equal to the length $(X+Y)$ set up on stations 17, 18 less 7 metres exactly, the pulses from generator 15 are applied to the counter 19, the count of which is applied to the converter 22 which produces an analogue signal controlling the roller table motors 20 to bring the roller table, and hence the beam, to rest when the further 7 metres has been travelled.

Considering now the circuit in detail, each of the pushbutton stations 17, 18 has a store 27, 28, respectively, to which the values set up are transferred on initiation of operation. The coincidence circuits 23, 26 compare the values in stores 27, 28 with the metre length detected by the photocells 13, which may be as described in U.S. Patent No. 3,322,961, and with the count in counter 25, respectively. The coincidence circuit 23 has a series of output lines on which signals are produced when the differences detected by the circuit 23 are successive whole numbers of metres from 0 metre to 9 metres, there being however no output for 8 metres difference. The 9 metre output is connected on line 30 to control the switch 24 for the contact roller 14, as described. The 7 metre line 31 is connected to one input of an AND gate 32 which is also connected to a logic unit 33 fed by the pulse generator 15. The logic unit 33 has two outputs, one on line 34 connected to AND gate 32 producing a pulse for each 2 millimetre movement of the beam in the direction of the arrow, and the other output on line 35 receiving a pulse for each 2 millimetre travel of the beam in the reverse direction. Thus, when the 7 metre line 31 is energized, the pulses on line 34 from the pulse generator 15 are permitted to pass through AND gate 32 to the counter 25. When the coincidence circuit 26 detects coincidence, an output appears on line 36 connected to one input of AND gate 37 which is also connected to the 7 metre line 31. Accordingly, on coincidence occurring, gate 37 produces an output which triggers the flip-flop 38 and opens AND gate 40. Gate 40 is also connected to the line 34, so that on coincidence being detected the pulses on line 34 are passed through gate 40 and an OR gate 41 to the bidirectional counter 19. As before noted, the circuit thus operates to feed pulses to counter 19 from the time the leading end of the beam is exactly 7 metres from the required stopping position.

The converter 22 supplies a controlling voltage to the motor control circuit 21 in dependence on the count in counter 19. On the initiation of operation of the system, the converter 22 supplies a steady voltage to give a high speed from the roller table motors 20 so that the beam is fed past the saw at a uniform speed. The supply of this voltage by the converter 22 is continued after AND gate 40 is opened and for a further 60 centimetres of movement of the beam, as indicated by a count of 300 pulses at the counter 19. After this movement, the leading end of the beam is 6.4 metres away from the final position and the voltage from the converter 22 to the motor control circuit 21 is thereafter changed progressively to decelerate the roller table and beam at a constant deceleration rate. This deceleration is fixed and is the maximum deceleration that can be safely accommodated with a maximum weight beam. When the leading end of the beam reaches a position 60 centimetres from the required position the controlling voltage from the converter which is still dependent, but not linearly, on the distance travelled, as detected by the count of the counter 19, is arranged to decelerate the beam at a different and lower rate such that the beam will rest at the required position. When the leading end of the beam is within 2 centimetres of the required position, the control voltage from converter 22 is at a sufficiently low value to operate contactor gear to disconnect the motors 20 and to short-circuit their inputs, in order to bring the motors to rest. The beam is then at the required position in relation to the saw 12 which is operated to cut off the required length.

If during the approach of the beam to the required position set up on the stations 17, 18 the movement of the beam is reversed, the pulse count in counter 19 is appropriately rectified by the application of pulses on the line 35 through the OR gate 42 to the subtract input of counter 19, in order to decrease the count appropriately.

It will be appreciated that inaccuracies in the positioning of the beam for cutting will occur, if there should be any slip between the roller 14 and the beam during the last 7 metres travel of the beam, since the count in the converter 22 and hence the control of the motors 20 will be incorrect. For this reason, two similar circuits 50, 51 are provided in order to check that in each metre movement of the beam, as detected by the photocells 13, 500 pulses are produced by the pulse generator 15. The two units 50, 51 are basically the same and therefore only the unit 50 will be described. This unit comprises an OR gate 52, to the inputs of which are connected the 7, 5, 3 and 1 metre lines from the coincidence circuit 23. The output from OR gate 52 is connected to a flip-flop 53 controlling an AND gate 54, which also receives pulses from the line 34. When AND gate 54 is opened by flip-flop 53, the pulses from line 54 pass to a unidirectional counter 55. Thus, when for example the coincidence circuit 23 detects a difference of 7 metres, flip-flop 53 is triggered and AND gate 54 is opened to permit the passage of the pulses from line 34 into counter 55. Counter 55 is designed to give an output to flip-flop 56 when the count reaches 500 which, if the system is operating properly, corresponds to 1 metre movement of the beam. Flip-flop 56 has two outputs which are connected respectively to two AND gates 57, 58.

The 6, 4, 2 and 0 metre output lines from coincidence circuit 23 are connected to a further OR gate 60 the output of which controls a flip-flop 61 having two outputs which, like those of flip-flop 56, are connected to the AND gates 57, 58. The output from AND gate 57 is connected via line 62 to an OR gate 63 and thence to an AND gate 64. AND gate 64 receives its other input from a delay circuit 65 fed with pulses from line 34, and the output of AND gate 64 is applied through the OR gate 42 to the subtract input of the counter 22. The output of AND gate 58, on the other hand, is applied on line 66 and through OR gate 67 to AND gate 68. Pulses on line 34 are applied through a second delay circuit 70 to the other input of AND gate 68 and the output of that gate is applied through the OR gate 41 to the ADD input of the counter 19.

As before mentioned, unit 51 is similar to unit 50 and differs from it only in the following respect: OR gate 71, corresponding to OR gate 52 of unit 50 is connected to the 6, 4 and 2 metre lines of the coincidence circuit 23, while OR gate 72, corresponding to gate 60 of unit 50, is connected to the 5, 3 and 1 metre lines of the coincidence circuit 23. The outputs of AND gates 73, 74, corresponding to gates 57, 58, respectively, are applied to OR gates 63, 67, respectively, through lines 62A, 66A, respectively.

In each of units 50, 51 there is a reset AND gate 75 controlled by triggers 56, 61. When both flip-flops 56, 61 are triggered, AND gate 75 opens and applies an output signal through OR gates 76, 77, 78 and 80 to reset flip-flop 53, counter 55, flip-flop 56 and flip-flop 61 respectively.

The operation of the checking units 50, 51 is as follows:

When the 7 metre output line 31 of coincidence circuit 23 is energised, AND gate 54 is opened to feed pulses to counter 55. If the system is operating correctly, counter 55 issues an output to trigger flip-flop 56 at the same time as flip-flop 61 is triggered by an input on the 6 metre line of coincidence circuit 23. When this occurs, the flip-flops 56, 61 simultaneously apply inputs to the AND gate 75 so that the flip-flops 56, 61 are instantaneously reset and there is no output on either of the lines 62, 66. If, on the other hand, the roller 14 and pulse generator 15 are operating incorrectly, so that more than 500 pulses are produced for a movement of 1 metre, counter 55 triggers flip-flop 56 before flip-flop 61 is triggered. When flip-flop 56 is triggered, AND gate 57 is opened, thereby opening AND gate 64 and permitting the passage of delayed pulses to the subtract input of counter 19. The application of subtract pulses to counter 19 in this way continues until flip-flop 61 is triggered causing operation of AND gate 75 and resetting of flip-flops 56, 61. The counter 19 receives subtract pulses through AND gate 64 at the same time as it receives ADD pulses through AND gate 40 and the effect is to cancel those ADD pulses and to ensure that the total pulses counted by counter 19 up to the time that the 6 metre position is received is the proper proportion of 500.

Similarly, if roller 14 and generator 15 produce fewer than 500 pulses in one metre travel, flip-flop 61 is triggered before flip-flop 56. AND gate 58 is opened, thereby opening AND gate 68 and causing delayed pulses to be applied through gate 68 to the ADD input of counter 19. Therefore, until flip-flop 56 is subsequently triggered to reset unit 50, counter 19 receives two ADD pulses for each 2 millimetre travel of the beam and the count in counter 19 is again corrected by the time the 6 metre position is achieved.

During the next metre travel of the beam, the operation of the generator 15 is checked by the second checking unit 51, by virtue of the 6 metre input to OR gate 71 and the 5 metre input to the OR gate 72. The number of pulses generated during that metre is checked and the count in counter 19 corrected if necessary, in exactly the same manner as has been described for unit 50. It will be appreciated that the second unit 51 is required, because it may be that an output is produced on the 6 metre line of coincidence unit 23 before counter 55 has counted 500 pulses; under those conditions, unit 50 must continue to operate to rectify the count, while unit 51 is counting pulses during the next metre. In this way, the units 50, 51 operate alternately to check the counts in successive metres of travel of the beam.

When the beam has been brought to rest at the required position, as described, and the saw 12 operated to cut the required length from the beam, the roller table at the downstream side of the saw is manually started to remove the cut length. When the tail of the cut length passes the photocell 13 nearest the saw 12, that photocell emits a signal on line 81 to reset to zero the stores 27, 28, in readiness for the next order, to reset the flip-flop 38 to prevent pulses immediately passing to converter 22 on the initiation of the next cycle, and to reset the converter 22 and the OR gates 76, 77, 78 and 80 of each of the units 50, 51. The system is then ready for the next operation.

While the control system has been described in relation to the cutting of lengths of beam, it will be appreciated that it can be equally applied to the cutting and measurement of other elongate bodies.

We claim:

1. An apparatus for monitoring the position of an elongate object displaceable along a predetermined path comprising
   (a) a plurality of detectors spaced at equal intervals along the path and arranged to detect the passing of the leading edge of the object,
   (b) a member arranged to contact the object as it passes,
   (c) a pulse generator arranged to be driven by the member, the pulse generator emitting a pulse for each unit of movement of the object, said unit being a submultiple of the spacing of the detectors,
   (d) a first counter for receiving the pulses from said generator,
   (e) an electronic checking circuit connected to at least two successive detectors and to the pulse generator and which is arranged to generate an output signal at a number of pulses corresponding to the spacing of the detectors, and
   (f) control means operated by the checking circuit and the next successive detector for correcting the count in the counter on the occurance of disparity between the number of pulses emitted and the distance between successive detectors.

2. An apparatus according to claim 1 wherein the checking circuit includes a checking counter and a pair of detection circuits connected to the checking counter and the next sucessive detector, one detection arranged to give a first signal to the control means for applying a subtract pulse to the first counter for each pulse from the generator on the issue of a signal from the checking counter until detection of the object by the next successive detector, and the other detector being arranged to give a second signal to the control means for applying a further add pulse to the first counter for each pulse from the generator on the detection by the next successive detector until the issue of a signal from the checking counter.

3. An apparatus according to claim 1 in which there are two checking circuits arranged to be operated alternatively for checking the number of pulses from the pulse generator during passage of the object between successive pairs of detectors.

4. An apparatus for controlling the movement of a beam past a saw including
   (a) roller tables arranged upstream and downstream of the saw,
   (b) a plurality of detectors spaced at equal intervals downstream of the saw and arranged to detect the leading edge of the beam,
   (c) a roller arranged to contact the beam as it passes,
   (d) a pulse generator arranged to be driven by the roller, the pulse generator emitting a pulse for each unit movement of the beam, that unit being a submultiple of the spacing of the detectors,
   (e) a fiirst counter for receiving the pulses from said generator,
   (f) an electronic checking circuit connected to at least two successive detectors and to the pulse generator and which is arranged to generate an output signal at a number of pulses corresponding to the spacing of the detectors, and
   (g) control means operated by the checking circuit and the next successive detector for correcting the count in the counter on the occurrence of disparity between the number of pulses emitted and the distance between successive detectors.

References Cited

UNITED STATES PATENTS

| | | | |
|---|---|---|---|
| 3,082,368 | 3/1963 | Rowe | 83—364 XR |
| 3,145,294 | 8/1964 | Jackson | 235—151.32 |
| 3,304,822 | 2/1967 | Barnes et al. | 83—364 XR |
| 3,343,436 | 9/1967 | Cockrell | 235—151.1 XR |

MARTIN P. HARTMAN, *Primary Examiner.*

U.S. Cl. X.R.

33—129; 83—364, 365, 74; 318—18